(12) United States Patent
Barnea

(10) Patent No.: US 11,935,119 B2
(45) Date of Patent: Mar. 19, 2024

(54) DEVICE AND METHOD FOR PRICING AND TRADING INCOME SHARING AGREEMENTS

(71) Applicant: Nimrod Barnea, Hertsliya (IL)

(72) Inventor: Nimrod Barnea, Hertsliya (IL)

( * ) Notice: Subject to any disclaimer, the term of this patent is extended or adjusted under 35 U.S.C. 154(b) by 0 days.

(21) Appl. No.: 17/879,490

(22) Filed: Aug. 2, 2022

(65) Prior Publication Data
US 2023/0044379 A1 Feb. 9, 2023

Related U.S. Application Data

(60) Provisional application No. 63/229,346, filed on Aug. 4, 2021.

(51) Int. Cl.
*G06Q 40/04* (2012.01)
(52) U.S. Cl.
CPC .................................. *G06Q 40/04* (2013.01)
(58) Field of Classification Search
CPC ....................................................... G06Q 40/04
USPC .......................................................... 705/37
See application file for complete search history.

(56) References Cited

U.S. PATENT DOCUMENTS

| | | |
|---|---|---|
| 5,745,885 A | 4/1998 | Mottola et al. |
| 5,809,484 A | 9/1998 | Mottola et al. |
| 6,625,582 B2 | 9/2003 | Richman et al. |
| 2005/0240515 A1 | 10/2005 | Fenstermaker |
| 2007/0050250 A1* | 3/2007 | Abulhasan ............ G06Q 30/02 705/14.69 |
| 2012/0290462 A1* | 11/2012 | Mehta .................... G06Q 40/04 705/37 |
| 2014/0364350 A1* | 12/2014 | Narita .................. C10M 135/36 508/272 |
| 2015/0242951 A1* | 8/2015 | Pillai ..................... G06Q 40/06 705/36 R |
| 2017/0011460 A1 | 1/2017 | Molinari et al. |
| 2020/0320530 A1* | 10/2020 | Liu .................... G06Q 20/0855 |
| 2020/0394652 A1 | 12/2020 | Youb et al. |
| 2021/0166313 A1* | 6/2021 | Cho ..................... G06Q 20/389 |

* cited by examiner

*Primary Examiner* — Lindsay M Maguire
(74) *Attorney, Agent, or Firm* — Bold IP, PLLC; Christopher Mayle

(57) ABSTRACT

The present invention is a device and method for pricing and trading income sharing agreements and providing a secondary market for income sharing agreements, which provides a solution to the problem of valuing and executing investment opportunities related to income sharing agreements. The core components of the invention are devices including a processor and memory executing computer readable instructions stored on the memory. Generally speaking, the components are configured as follows: the processor receives information about an entity in order to predict future income of the entity for the duration of an income sharing contract, the processor prepares and sends an income sharing agreement to the entity and receives an agreement. Results of the income sharing agreement may be used to value future income sharing agreements.

20 Claims, 6 Drawing Sheets

100   170

Personal Information:
Name: ____
Sex: __
Date of Birth: __/__/____
Address:_____

Income information:                    — 134
Profession:_____
Annual Income:_____
Bank Account:_____

Education information:
Institution:_____
Degree:_____
Graduation date: __/__/____

FIG. 5

DEVICE AND METHOD FOR PRICING AND TRADING INCOME SHARING AGREEMENTS

CROSS REFERENCE TO RELATED APPLICATIONS

This application claims priority to U.S. Provisional Patent No. 63/229,346 filed on Aug. 4, 2021, which is incorporated in its entirety.

BACKGROUND

Income sharing agreements (ISAs) are a growing field of investment. Income sharing agreements are made between entities where the recipient agrees to pay a certain percentage of their income for a certain period of time in return for an upfront payment. These types of agreements are currently most commonly used for financing education.

A single income sharing agreement is a high risk investment because the person receiving the financing in the income sharing agreement may have unexpectedly low (or conversely unexpectedly high) income. Accordingly, ISAs and other similar agreements based on the recipients income have been given out almost exclusively by very large entities. Thus, smaller investors have had almost no access to ISAs as investments. Further, very little innovation has occurred in the field of ISAs because of the lack of access.

SUMMARY

The disclosed device is unique when compared with other known devices and solutions because it provides two technical innovations in the field of income sharing agreements. The first innovation is in the usage of large amounts of available data to value an income sharing agreement for various types of entities (individuals, government entities, corporations, etc.).

The second innovation is in providing a secondary market for trading equities based on income-based agreements. The secondary market provides better liquidity to the equities and allows smaller entities to invest in these equities. The secondary market also provides a platform for tracking performance of the equities which may be used in valuing new income sharing agreements.

BRIEF DESCRIPTION OF DRAWINGS

FIG. 5 shows another example of input screens on a display of a first electronic device.

DETAILED DESCRIPTION

In the Summary above, in this Detailed Description, the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range including that number (which may be a range having an upper limit or no upper limit, depending on the variable being defined). For example, "at least 1" means 1 or more than 1. The term "at most" followed by a number is used herein to denote the end of a range, including that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)—(a second number)," this means a range whose limits include both numbers. For example, "25 to 100" means a range whose lower limit is 25 and upper limit is 100 and includes both 25 and 100.

Figure 1:
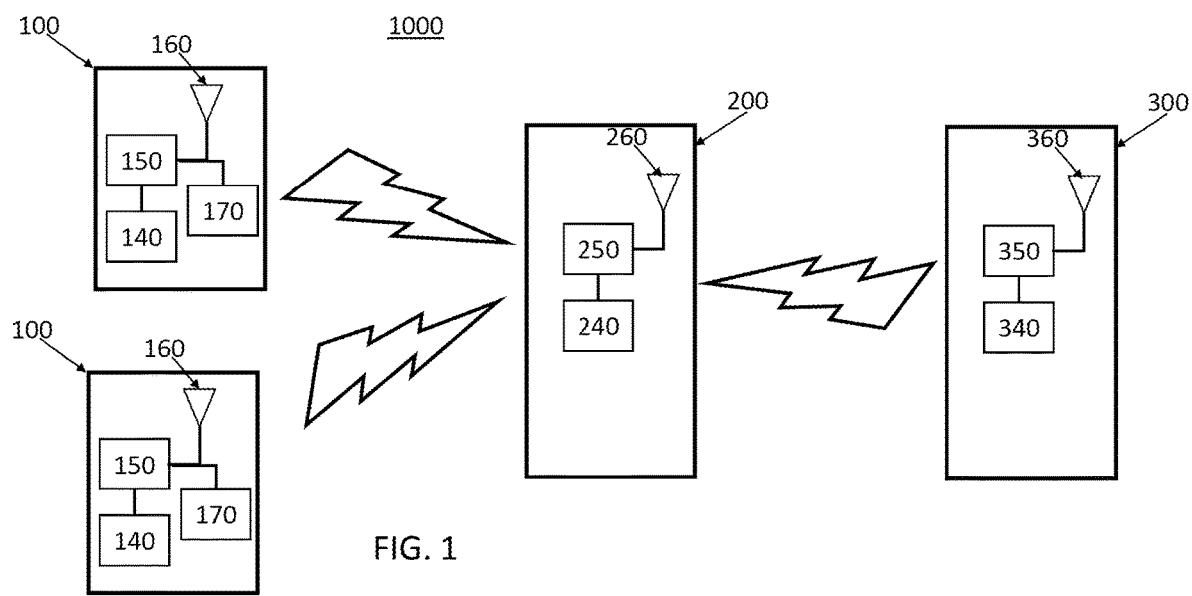
FIG. 1 shows an example schematic view of a network.

FIG. 1 shows an example schematic view of a network 1000. The network 1000 may include at least one first electronic device 100 and at least one second electronic device 200. The network may include various other electronic devices that convey information in the network, for example from the first electronic device 100 to the second electronic device 200. The first electronic device 100 may be a personal electronic device such as a personal computer, cell phone, etc. The first electronic device may include a memory 140, a processor 150, and a transceiver 160. The memory 140 may include volatile and non-volatile memory. The memory 140 may contain therein instructions for operating the first electronic device and other stored information. The processor 150 may include one or more processing devices such as a central processing unit, controller, or other similar hardware. The processor 150 may be configured to execute the instructions stored in the memory 140 and control the first electronic device 100. The transceiver 160 may include one or more communication interfaces for wireless communications, wired communications, fiber optic communications, etc. The transceiver 160 may operate based on commands received from the processor 150 and be configured to communicate electronically with other electronic devices in the network 1000. The first electronic device 100 may also include a display 170. The display 170 may be configured to display images and information for a user based on commands received from the processor 150. The display 170 may be a touch screen or otherwise be able to receive input from a user.

The second electronic device 200 may include one or more computers, servers, or other similar devices. The second electronic device 200 may include one or more memories 240, one or more processors 250, and one or more transceivers 260. The memory 240 may include volatile and non-volatile memory. The memory 240 may contain therein instructions for operating the second electronic device 200 and other stored information. The processor 250 may include one or more processing devices such as a central processing unit, controller, or other similar hardware. The processor 250 may be configured to execute the instructions stored in the memory 240 and control the second electronic device 200. The transceiver 260 may include one or more communication interfaces for wireless communications, wired communications, fiber optic communications, etc. The transceiver 260 may operate based on commands received from the processor 250 and be configured to communicate electronically with other electronic devices in the network 1000.

The third electronic device 300 may include one or more computers, servers, or other similar devices. The third electronic device 300 may include a memory 340, a processor 350, and a transceiver 360. The memory 340 may include volatile and non-volatile memory. The memory 340 may contain therein instructions for operating the third electronic device 300 and other stored information. The processor 350 may include one or more processing devices such as a central processing unit, controller, or other similar hardware. The processor 350 may be configured to execute the instructions stored in the memory 340 and control the third electronic device 300. The transceiver 360 may include one or more communication interfaces for wireless communications, wired communications, fiber optic communications, etc. The transceiver 360 may operate based on commands received from the processor 350 and be configured to communicate electronically with other electronic devices in the network 1000.

Figure 2:
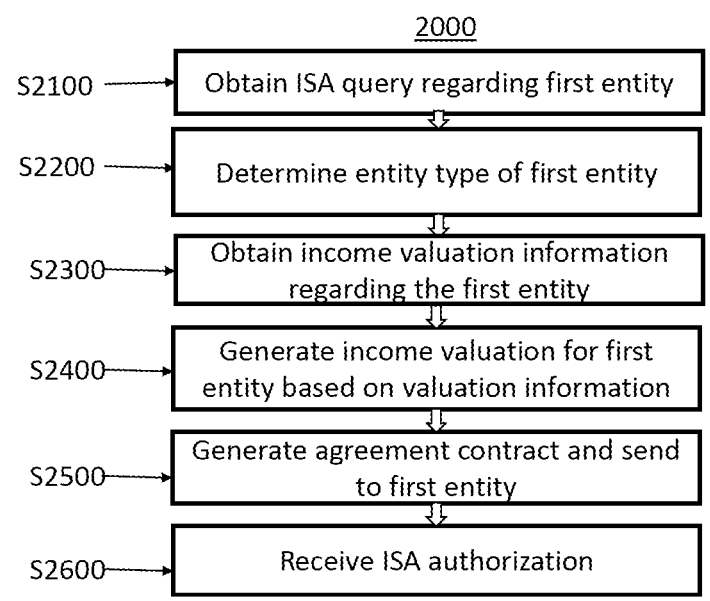
FIG. 2 shows an example flow diagram of operations to generate income sharing agreements.

FIG. 2 shows an example flow diagram 2000 of operations to generate income sharing agreements (ISAs). All of the operations of flow diagram 2000 may be performed by the second electronic device 200. Restated, the processor 250 may execute instructions stored on the memory 240 to perform the following operations (steps). At S2100, the second electronic device 200 may obtain an ISA query regarding a first entity. The first entity may be any type of entity including: an individual, household, corporation, government entity (local, state/province, federal, etc.), partnership, charity, etc. The ISA query may identify the entity, entity type, and include entity specific information (e.g., personal information for an individual). The ISA query may be received from a first electronic device 100 which may be used by an entity or representative of an entity to submit the query.

The entity specific information may identify information about the entity such as financial information (net worth, income, etc.) education level, age, field of practice, number of employees, incorporation information (e.g., C corporation incorporated under the laws of the state of Delaware). For example, for an individual, the entity specific information may include name, sex, age/date of birth, address, income, profession/employment information (profession, years of experience in profession, employer, title, etc.) income type (salary, hourly, commission, etc.), net worth information (e.g., bank account, investment account, property holdings, current debts), and education information (school/institution, degree, grades/class standing, graduation date, etc.).

Information such as race, ethnicity, religion, citizenship/residency status in the country of residence may also be included in some circumstances.

As another example, for a local government such as a city, the entity specific information may include city location, city geographical size, city population, main industries/employers in and around the city, city population demographics, city population growth (or decline) over time, city population turnover rate (i.e., how many people move in and out of the city each year, city tax income, city annual expenses (i.e., budget). As yet another example, for a corporate entity, entity specific information may include number of employees, average experience of employees, employee turnover rate, education level of employees, product or service type(s) (e.g., auto parts manufacturing, legal services, bakery, etc.), annual revenue, revenue growth (or decline), expenses, debts, location(s), years in business, etc. The ISA query may also include a requested agreement amount, proposed number of years for an income sharing agreement, proposed income sharing percentage (or maximum income sharing percentage), and other requested income sharing terms.

At S2200, the second electronic device may determine an entity type of the first entity based on the ISA query. In some circumstances, additional information to be included in the ISA query of the first entity may be requested from the first entity (by sending a request to a first electronic device, email address, web portal, etc. associated with the first entity). Responses to the request for additional information may be included in the ISA query.

At S2300, the second electronic device 200 may obtain income valuation information regarding the first entity. The income valuation information may include entity specific information for the first entity and other entities, and economic data. The entity specific information may include income information for other entities and economic information. The income valuation information may be obtained by receiving the income valuation information from the first electronic device 100 which sent the ISA query, a third electronic device 300 (such as a database), and/or from the information stored on the memory 240 of the second electronic device 200.

At S2400, the second electronic device 200 may generate an income valuation for the first entity based on the income valuation information. The income valuation may be based on a prediction of income over the course of a proposed income sharing agreement based on a suggestion/request from a user or options provided by the proposed income sharing agreement. The second electronic device 200 may determine a predicted income of the first entity over the course of a proposed income sharing agreement based on the entity type and other entity specific information. For example, the predicted income for an individual may be determined by looking up (either in information stored in the memory 240 or another information storage device) the median income growth of individuals with similar entity specific information and adjusting for inflation for future years which have been sorted into one or more categories or clusters in the memory 240. For example, the income, education, and location information of an individual may be used to determine who the peer group of the individual is. The average income (normally a median income would be used, but a mode or mean may be used as well) of the peer group over the last five years. The peer group may be very specific (e.g., attorneys who graduated from Harvard law school and are working for top 50 law firms with two years of experience) or may be broader (e.g., factory worker with no college). Also, multiple average incomes may be produced based on the different peer groups of the individual.

For corporations, charities, government entities, and other entities in established industries/sectors/areas, these same principles of determining peers and basing an income valuation on past peer performance may be used. However, for some corporations it may be very difficult to find reliable data on peers. This may be because peers do not exist (e.g., a corporation that sells a patented device that has no direct competitors), competitors are of a much different size or makeup than the corporation, or an industry is too new to predict how companies will grow. In these cases, different sets of data may be used and factored together to establish the income valuation. For example, a company in area x, industry y, and size z may not have a reliable data pool for establishing peers or an income valuation based on all of those factors so an income valuation may be made by factoring data for companies of size z in area x and companies of size z in industry y nationwide or any other combination of entity specific data that has a reliable data set.

Many possibilities exist for generating algorithms for establishing income valuations based on entity specific information. The determined entity type may be used to determine which algorithm is used to predict the income of the entity. For example, a different algorithm may be used for predicting income of individuals and predicting income of charities, and another may be used for predicting income of businesses. Further, different algorithms may be used for entities of different sizes (e.g., one for large corporations and another for small corporations) length of existence/age, etc.

In some cases, a valuation may be made based on machine learning techniques which may have past income data of entities of the same type and sometimes entities of different types as data pools. For example, a machine learning algorithm may be much more efficient than a standard algorithm just establishing peers and comparing past entity specific data at recognizing areas where economic growth is likely to occur based on a myriad of factors represented in entity specific information for a variety of entity types in a variety of industries. A restaurant in an area with booming economic growth is far more likely to succeed than a restaurant in an area with a declining economy even with all other factors being equal. Accordingly, based on far larger datasets than could be used to establish peers, a supervised or unsupervised machine learning algorithm may be used to provide valuation for incomes of entities for the course of a lifetime of an income sharing agreement. However, the second electronic device 200 does not need to predict the exact income of every single business, government entity, charity, or individual to provide a useful valuation. As will be described in further detail below, the individual income sharing agreements may be bundled together based on several factors to form securities that can be invested in. So, the valuation algorithm would be equally successful in the case where the algorithm predicted every entity's income perfectly as the case where the gains from the entities that over performed expectations cancelled out the losses from entities that underperformed expectations.

In some non-limiting embodiments, the trained machine learning algorithm may include a regression-based model that accepts the prior income data, industry data, competitors data, type of individual or entity data, age or life of the entity data, size of the entity, prior agreements and modified agreements, economic data, or location of the individual or entity as input data. The trained machine learning algorithm may be part of the algorithm model discussed. The trained machine learning algorithm may be of any suitable form, and may include, for example:, a neural network. A neural network may be software representing human neural system (e.g., cognitive system). A neural network may include a series of layers termed "neurons" or "nodes." A neural network may comprise an input layer, to which data is presented; one or more internal layers; and an output layer. The number of neurons in each layer may be related to the complexity of a problem to be solved. Input neurons may receive data being presented and then transmit the data to the first internal layer through the connections' weight. A neural network may include, for example, a convolutional neural network, a deep neural network, or a recurrent neural network.

The trained machine learning algorithm may compute the future predicted income data of the user as a function of the prior income data of other users for the term of their income sharing as well as previous predicted prior income data, prior type of individual or entity data, industry and competitors data, prior age or life of the entity data, prior size of the entity data, prior economic data location of the individual or entity data, and any other information from prior agreements and modified agreements, as input data, or one or more variables indicated in the input data. The one or more variables may he derived from the prior income data, type of individual or entity data, industry and competitors data age or life of the entity data, size of the entity, location of the individual or entity, economic data or prior agreements, and updated or modified agreements or other third party data. This function may be learned by training the machine learning algorithm with training sets.

The machine learning algorithm may be trained by supervised, unsupervised, or semi-supervised learning using training sets comprising data of types similar to the type of data used as the model input. For example, the training set used to train the model may include any combination of the following: prior income data, prior type of individual or entity data, prior industry and competitors data age or life of the entity data, prior size of the entity, prior location of the individual or entity, or prior agreements and updated agreements. Additionally, the training set used to train the model may further include user data, including, but not limited to, an actual name, contact information, taxes, proof of income documents, identity verification documents, or other documents with entity specific information and other data related to the user. Accordingly, the machine learning model may be trained to map input variables to a quantity or value of income prediction for the user. That is, the machine learning model may be trained to determine a quantity or value of the income prediction of the user or entity as a function of various input variables.

The trained machine learning model may utilize principal component analysis (PCA). The PCA may convert a set of variables or input data into a set of values of linearly uncorrelated variables, which include a first principal component that has the largest possible variance. For example, the prior income data, economic data, type of individual or entity data, industry and competitors data. age or life of the entity data, size of the entity, location of the individual or entity, or prior agreements and modified agreements and ISA.s may be converted to a set of variables representing other characteristics of the user of entity. The PCA may be used to define one or more variables that are more important than other variables or reduce the number of variables needed to be trained and computed by a machine learning model. Overlapping qualities after a predetermined number of occurrences in past individuals may create a cluster which then may be stored as one or more variables to speed up the process and calculate the income at a more accurate manner whereby the cluster provides a higher weighted average in the determination of the predicted income.

Once a prediction of income for the first entity is performed, the income valuation may then determine an agreement value based on current interest rates, current inflation rate, and predicted interest rates. The agreement value may be made in comparison to other loan and investment options. For example, if conventional business loans are being offered at 3%, these income sharing agreements may be valued at a competitive but increased effective rate of 4% because these agreements may be more appealing to entities with higher risk and higher income volatility (e.g., start-up corporations and people early on in their career) than entities that get conventional loans whereby the information stored in the memory automatically alters the rate as entities with far more established income records such as government entities may be given lower than average interest rates. There are many ways of assessing risk and establishing a competitive interest rate using the entity specific information, current economic data (e.g., current interest rates, current unemployment rate, current inflation rate, etc.), and predicted economic data, (e.g., predicted future interest rates, future unemployment rate, future inflation rate, etc.) other than those shown by example above. This information may also be filtered by the investors when searching through the entities on a user interface. The results may automatically be arranged based on their previous agreements where those with a specific type of loan may be presented to the investors before the others or at a strategically placed location. Any algorithm or method for determining an agreement value may be used to establish terms for the income sharing agreement. Example terms of the income sharing agreement may be payment of xx % of income for yy years for an amount of $zz.

Alternatively, an income valuation for the first entity based on the income valuation information could be set in a bidding process between potential investors. In the bidding process, investors may be given income valuation information and bids may be received from the potential investors.

At S2500, the second electronic device 200 may generate an agreement contract based on the terms agreed upon and send the agreement contract to the first entity. The generated agreement contract may be an electronic document or physical document. The generated agreement contract may be mailed to an address associated with the first entity, emailed to an email address associated with the first entity, sent to a first electronic device associated with the first entity, and/or a entered into a web portal associated with the first entity.

In some example embodiments or in some circumstances (such as when multiple bids are received from potential investors, or when different length term agreements are generated), multiple agreement contracts may be generated and sent to the first entity.

At 52600, the second electronic device 200 may receive (income sharing agreement) authorization. Authorization may be received via email, web portal, or any other form of electronic communication (including a user of the second electronic device 200 inputting authorization based on a hard copy being received). Once approval is received, further steps such as dispersing funds and collecting payments based on the shared income agreement may be made.

Figure 3:
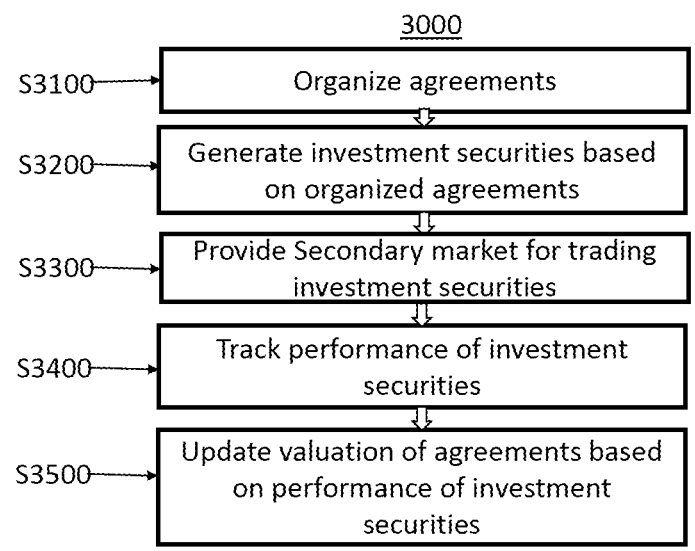
FIG. 3 shows an example flow diagram of operations to operate a secondary market for income sharing agreements.

FIG. 3 shows an example flow diagram 3000 of operations to operate a secondary market for income sharing agreements. All of the operations of flow diagram 3000 may be performed by the second electronic device 200. Restated, the processor 250 may execute instructions stored on the memory 240 to perform the following operations (steps). At 53100, the second electronic device 200 may organize agreements. Agreements may be organized in a variety of ways. For example, agreements may be organized based on industry, entity type, entity size, agreement date, age, etc. Some examples may be tech startups (organized by size, entity type, industry, and age), charities helping women (organized by entity type and industry), and small town governments (organized by entity type, and size).

At S3200, the second electronic device 200 may generate investment securities based on the organized agreements. For example, shares or other investment securities may be generated which are backed by the agreements.

At S3300, the second electronic device 200 may provide a secondary market for trading the investment securities. The secondary market may be a trading platform which allows investors to buy and sell the investment securities.

At S3400, the second electronic device 200 may track performance of investment securities compared to estimated income of the agreements (as determined in S2400). The actual income of the agreements compared to the predicted income may be compared and this information may be used (especially if a machine learning algorithm is utilized in S2400) as income valuation data.

At S3500, the second electronic device may update valuation of agreements based on performance of investment securities. An investment security may have an expected income based on the valuation of the individual agreements that back the investment security (minus expenses such as collections, services, administrative costs, etc.) The valuation of the investment security may be updated based on performance of the investment security and current and further economic data. For example, if individuals have had above expected income in one industry, financing to workers in that industry may have increased income based on the shared income agreement terms and thus, the investment security will pay out more to the holders of the securities and the predicted pay outs (i.e., valuation) can be increase based on those increases.

Figure 4:
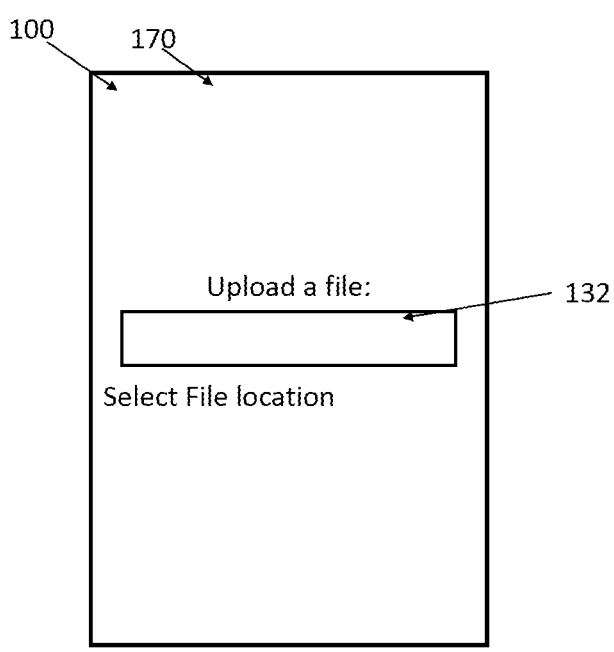
FIG. 4 shows an example of input screens on a display of a first electronic device.
Figure 6:
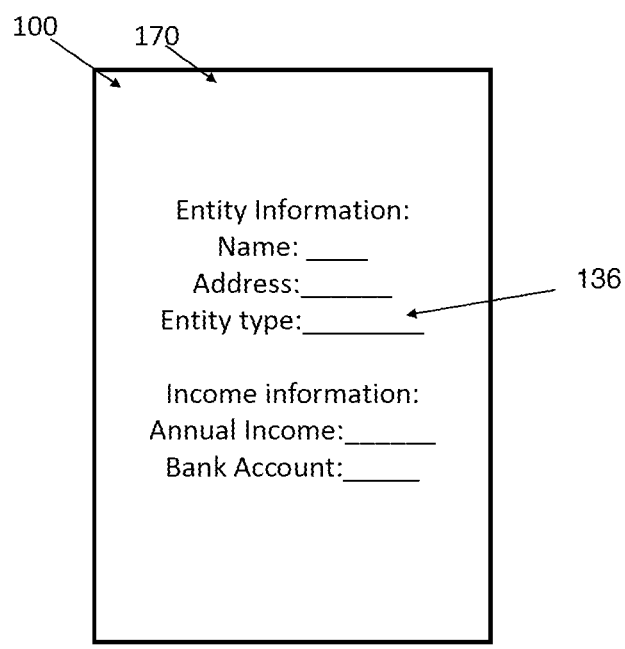
FIG. 6 shows another example of input screens on a display of a first electronic device.

FIGS. 4-6 show example input screens on the display 170 of the first electronic device 100. FIG. 4 shows an example input screen on the display 170 of the first electronic device 100 with a first display 132 where the user (who may be the first entity or a representative of the first entity) of the first electronic device 100 is asked to upload files. These files may be tax documents, proof of income documents, identity verification documents, or other documents with entity specific information.

FIG. 5 shows an example input screen on the display 170 of the first electronic device 100 with a second display 134 where the user of the first electronic device 100 is asked to provide entity specific information for an individual. Example of entity specific information for an individual may include name, sex, date of birth, address, profession, annual income, banking information (such as account numbers to verify income), and education information such as institution, degree, and graduation date. The type of entity specific information that is requested may depend on the type of entity. For example, corporations do not have a sex so that would not be queried of a corporation.

FIG. 6 shows an example input screen on the display 170 of the first electronic device 100 with a third display 136 where the user of the first electronic device 100 is asked to provide entity specific information including entity name, address, and entity type as well as annual income and bank information. The entity specific information requested in FIG. 4-6 may be sent from the first electronic device 100 to the second electronic device 200 via electronic communication. The request for information may be presented to the user on a web portal, email, application, or other electronic method of communication.

Accordingly, the second electronic device 200 and the network 1000 provide at least two technical innovations in the field of the income sharing agreements. The first innovation is in the usage of large amounts of available data to value an income sharing agreement for various types of entities (individuals, government entities, corporations, etc.).

The second innovation is in providing a secondary market for trading equities based on income-based agreements. The secondary market provides better liquidity to the equities and allows smaller entities to invest in these equities. The secondary market also provides a platform for tracking performance of the equities which may be used in valuing new income sharing agreements.

Accordingly, the present description provides for various embodiments for a second electronic device 200 and network 1000. Many uses and advantages are offered by the second electronic device 200 and network 1000 as described above in one or more non-limiting embodiments in the present description.

The corresponding structures, materials, acts, and equivalents of any means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention, according to one or more embodiments described in the present description, may be practiced with modification and alteration within the spirit and scope of the appended claims. Thus, the description is to be regarded as illustrative instead of restrictive of the present invention.

What is claimed is:

1. A system for pricing income sharing agreements by establishing income valuations, the system comprising:
at least one processor of a server; and a non-transitory storage device of the server storing instructions that, when executed by the processor of the server, cause the server to perform operations comprising:
obtain an income sharing agreement query regarding a first entity;
determine an entity type of the first entity;
obtain income valuation information regarding the first entity based on the income sharing agreement query, and determined entity type;
train a machine learning model to map input variables to a quantity or value of income valuation for the first entity, wherein the machine learning model collect: the income valuation information the machine learning model utilizing principal component analysis to convert a set of variables or input data into a set of values of linearly uncorrelated variables which include a first principal component that has a largest possible variance;
convert the income valuation information into a first set of variables representing other characteristics of the first entity to define one or more variables that are more important than other variables or reduce a number of variables needed to be trained and computed by the machine learning model, wherein a cluster is created from overlapping. qualities after a predetermined number of occurrences in past entities which then are stored as the one or more variables to be applied to entities with associated entity specific information wherein the duster provides a higher weighted average in the determination of the income valuation of the first entity,
determine that a data pool with a predetermined amount of data with first quality data point, a second quality data point, and third quality data point corresponding to the first entity exists;
factor in, wherein when there is no data pool found which factors in a first data pool with the predetermined amount of data with the first quality data point and the second quality data point to a second data pool with the predetermined amount of data with the second quality data point and the third quality data point;
generate the income valuation for the first entity based on the machine learning model
generate an income sharing agreement based on the income valuation in a digital or physical format;
analyze data from a plurality of data pools on the storage device using prior income information for a plurality of entity types in a plurality of industries trained on the machine learning model:
determine, by the machine learning model, from the analyzed data a location area where economic growth is to occur.

2. The system of claim 1, wherein the at least one processor is further configured to cause the server to: organize agreements, including a first agreement from the generated agreement.

3. The system of claim 1, wherein the at least one processor is further configured to cause the server to:
provide an online secondary market for investors with a direct purchasing process and a bidding process for the investors; and
adjust a value of the income sharing agreement with an interest rate in response to predicted economic data for the location area; and
bundle the income sharing agreement with one or more determined second income sharing agreements to compensate for missed predictions.

4. The system of claim 3, wherein the at least one processor is further configured to cause the server to:
generate investment securities based on the organized agreements.

5. The system of claim 4, wherein the at least one processor is further configured to cause the server to:
track performance of the investment securities; and
retraining the machine learning model with a comparison between the income valuation and an actual valuation as the income valuation data.

6. The system of claim 1, wherein the income valuation information includes entity specific information for the first entity and other entities, and economic data.

7. A system for pricing and trading income sharing agreements by establish income valuations, the system comprising:

a network;

a processor of a server; and a non-transitory storage device of the server storing instructions that, when executed by the processor of the server, cause the server to perform operations comprising:

obtaining an income sharing agreement query regarding a first entity on a first entity device over the network;

receiving first entity information data;

receiving current income information regarding the first entity;

calculating a predicted income valuation for the first entity using a machine learning model utilizing principal component analysis to convert a set of variables or input data into a set of values of linearly uncorrelated variables which include a first principal component that has a largest possible variance, wherein clusters of previous income and type of entity are created from overlapping qualities in previous entities having prior income information that is related to the current income information which then are stored as one or more variables to be applied to the first entity;

applying a first algorithm to calculate the predicted income valuation by determining that a data pool with a predetermined amount of data with first quality data point, a second quality data point, and third quality data point corresponding to the first entity exists;

applying a second algorithm to calculate the predicted income valuation wherein when there is no data pool found which factors in a first data pool with the predetermined amount of data with the first quality data point and the second quality data point to a second data pool with the predetermined amount of data with the second quality data point and the third quality data point; and generating an income sharing agreement and agreement value based on the predicted income valuation as well as current interest rates, current inflation rate, and predicted interest rates.

8. The system of claim 7, wherein the instructions are executed by the server to perform:

track performance of the income sharing agreement; and retraining the machine learning model with a comparison between the income valuation and an actual valuation as the income valuation data.

9. The system of claim 8, wherein the prior income information of the previous entities includes industry data, location of entity data, and size of the entity data.

10. The system of claim 9, wherein the instructions are executed by the server to perform:

generating a secondary marketplace for trading investment securities backed from collected income sharing agreements; and automatically adjusting the value and interest rates of the income sharing agreements on the secondary marketplace in response to more actual income records for that type of entity stored in the storage device.

11. The system of claim 8, wherein terms of the income sharing agreement are also determined by the machine learning model.

12. The system of claim 8, wherein the instructions are executed by the server to perform:

generating an income sharing agreement contract based on terms agreed upon; and sending the income sharing agreement contract to the first entity.

13. The system of claim 12, wherein instructions are executed by the server to perform:

sending the income sharing agreement contract to the first entity as an electronic document or physical document.

14. The system of claim 13, wherein the system provides a secondary market for a direct purchasing process or bidding process to join the income sharing agreement.

15. The system of claim 8, wherein the instructions are executed by the server to perform:

displaying the income sharing agreement and the agreement value to one or more investors on a user interface where the system allows for one investor of the one or more investors or multiple investors of the one or more investors to join the income sharing agreement.

16. The system of claim 15, wherein the instructions are executed by the server to perform:

adjusting the user interface in response to previous agreements of the one or more investors.

17. The system of claim 8, wherein the instructions are executed by the server to perform:

generating investment securities based on the income sharing agreement.

18. The system of claim 17, wherein the instructions are executed by the server to perform:

tracking performance of the investment securities; and updating valuation of agreements based on performance of the investment securities.

19. The system of claim 8, wherein the machine learning model uses a regression based model to collect the prior income information.

20. The system of claim 8, wherein the instructions are executed by the server to perform:

adjusting the agreement value in response to other loan and investment options and type of entity.

* * * * *